United States Patent
Miller

(10) Patent No.: US 9,413,276 B2
(45) Date of Patent: Aug. 9, 2016

(54) DC MOTOR CONTROL OVER WIDE DYNAMIC RANGE

(71) Applicant: Process Control Corporation, Doraville, GA (US)

(72) Inventor: Lloyd Miller, Canton, OH (US)

(73) Assignee: PROCESS CONTROL CORPORATION, Doraville, GA (US)

( * ) Notice: Subject to any disclaimer, the term of this patent is extended or adjusted under 35 U.S.C. 154(b) by 23 days.

(21) Appl. No.: 14/494,951

(22) Filed: Sep. 24, 2014

(65) Prior Publication Data

US 2016/0087560 A1    Mar. 24, 2016

(51) Int. Cl.
*H02P 6/00*    (2016.01)
*H02P 6/06*    (2006.01)
*H02P 6/16*    (2016.01)

(52) U.S. Cl.
CPC ...... *H02P 6/06* (2013.01); *H02P 6/002* (2013.01); *H02P 6/165* (2013.01)

(58) Field of Classification Search
CPC .................................................. H02P 5/06
USPC ........... 318/400.01, 400.04, 400.14, 400.15, 318/432, 700, 701, 721, 799, 400.02, 599, 318/800; 388/800, 819, 823
See application file for complete search history.

(56) References Cited

U.S. PATENT DOCUMENTS

| | | | | |
|---|---|---|---|---|
| 5,296,787 A * | 3/1994 | Albrecht | .......... | H02P 6/06 318/400.1 |
| 7,205,738 B2 * | 4/2007 | Chapman | .......... | H02P 6/14 318/400.09 |
| 2005/0212472 A1 * | 9/2005 | Chapman | .......... | H02P 6/14 318/400.1 |
| 2014/0028226 A1 * | 1/2014 | Mergener | .......... | H02P 6/14 318/400.09 |

* cited by examiner

*Primary Examiner* — Anthony M Paul
(74) *Attorney, Agent, or Firm* — Thomas | Horstemeyer, LLP

(57) ABSTRACT

Various examples are provided for brushless direct current (DC) motor control over a wide dynamic range. In one example, among others, a system including a power drive coupled to a DC motor and a MCU configured to control commutation of the DC motor based upon shaft speed of the DC motor, where the MCU transitions between a motion-based commutation mode and a time-based commutation mode in response to a comparison of the shaft speed with a predefined threshold. In another example, a method includes commutating a DC motor in response to a transition in rotor position of the DC motor and transitioning from a motion-based commutation mode to a time-based commutation mode in response to a comparison of shaft speed of the DC motor to a predefined threshold.

20 Claims, 15 Drawing Sheets

DC MOTOR CONTROL OVER WIDE DYNAMIC RANGE

BACKGROUND

The speed of brushed or brushless direct current (DC) motors can be adjusted using closed loop feedback. For example, shaft speed of the motor can be used as a feedback signal to maintain or adjust the speed of the motor. In smaller brushless DC motors, Hall Effect sensors can be used to provide the feedback signal. In traditional closed loop brushless DC motor control, commutation of the brushless DC motor is controlled using the Hall Effect sensors to detect rotor motion.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
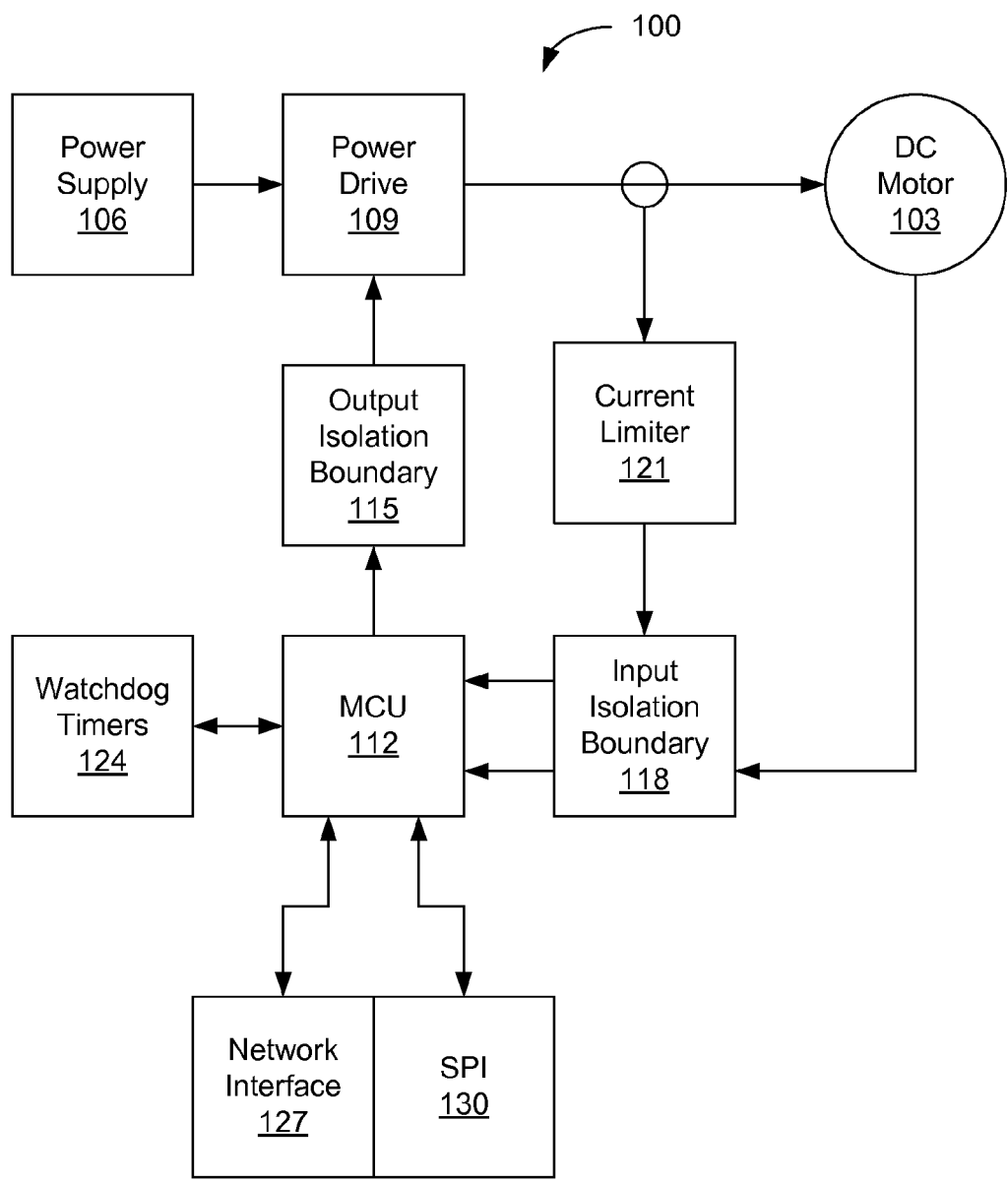
FIG. 1 is a graphical representation of an example of a universal motor controller for DC motors in accordance with various embodiments of the present disclosure.

Disclosed herein are various examples related to brushed or brushless direct current (DC) motor control. Brushed DC motors include permanent magnets in the stator and brushless DC motors include permanent magnets in the rotor. Reference will now be made in detail to the description of the embodiments as illustrated in the drawings, wherein like reference numbers indicate like parts throughout the several views.

Referring to FIG. 1, shown is an example of a universal motor controller 100 for wide dynamic range motor control of a brushless DC motor 103. Such a system can be used to drive brushed and brushless DC motors. The universal motor controller 100 is suitable for extremely low speed operation of the brushless DC motor 103 using time-based brushless commutation. Closed loop control can be provided for the motor using feedback from Hall Effect sensors for a brushless DC motor or a tachometer for a brushed DC motor.

As shown in FIG. 1, the universal motor controller 100 includes a power supply 106 that provides DC power to a power drive 109 that supplies the DC motor 103. The power drive 109 can include drive circuitry capable for switching voltages from 12 VDC to 340 VDC. The output voltage of the power drive 109 is contingent upon the DC output voltage of the attached power supply 106. In addition to providing the DC operating voltages, the power supply 106 can also include surge suppression, inrush current limiting, and switched output voltages. For example, the output voltage may be selected from a plurality of standardized voltages (e.g., 180V or 320V).

The universal motor controller 100 also includes a micro control unit (MCU or microcontroller) 112 that can implement motor, network interface, serial peripheral interface (SPI), and/or other housekeeping tasks of the universal motor controller 100. Motor tasks include data acquisition and control functions for driving the DC motor 103. The MCU 112 can perform some or all of the tasks on a real-time event driven basis. An output isolation boundary 115 and an input isolation boundary 118 are provided to protect the MCU 112 from the higher operating voltages of the DC motor 103 and power drive 109. A current limiter 121 includes circuitry detects when a fault condition exists and provides an indication to the MCU 112. Watchdog timers 124 are used to monitor operation of the universal motor controller 100. Communications with the MCU 112 can be carried out through the network interface 127 and/or serial peripheral interface (SPI) 130.

Control of the motor speed from 0.5 RPM to 5000 RPM can yield a dynamic range of 10,000 to one. When controlling a brushless DC motor, this wide dynamic range can be accomplished using closed loop motion-based commutation at or above a predefined threshold and closed loop time-based commutation at or below the threshold. Signals from Hall Effect sensors in the brushless DC motor can be used to provide the closed loop feedback. When controlling a brushed DC motor, a tachometer is used to provide closed loop feedback.

Figure 2:
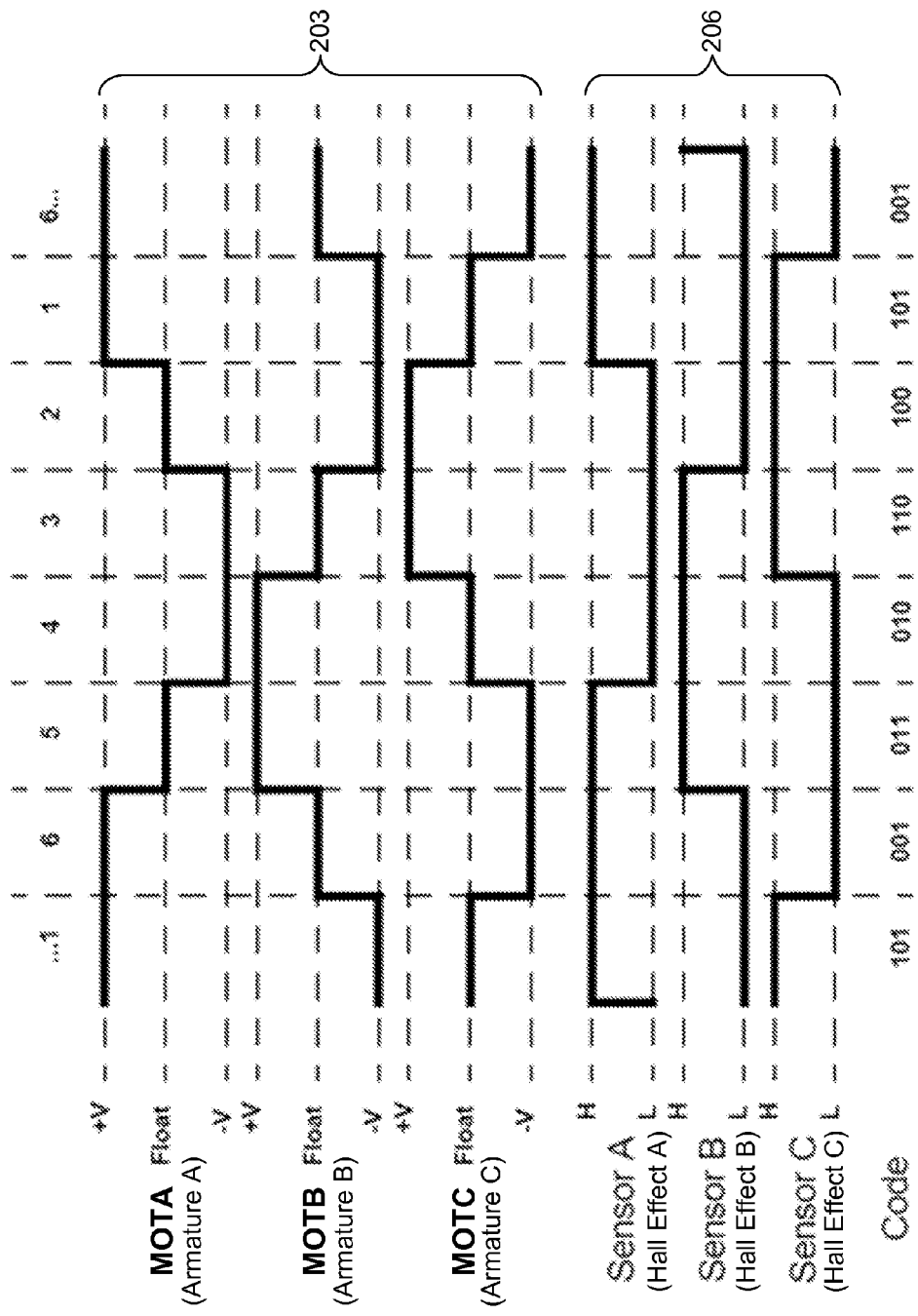
FIG. 2 is an example of the relationship between voltage applied to windings of a brushless DC motor and signals from the Hall Effect sensors in the brushless DC motor in accordance with various embodiments of the present disclosure.

In the brushless mode, the closed loop motion-based commutation can be accomplished using proportional-integral-derivative (PID) control. In PID closed loop control of a brushless DC motor, the DC motor 103 is commutated every time a new Hall Effect sensor location is reached. Signals from Hall Effect sensors in the DC motor 103 can be used to determine the rotor position and/or speed of the DC motor. FIG. 2 depicts an example of the relationship between voltage 203 applied to the motor windings (MOTA, MOTB and MOTC) and signals 206 from the Hall Effect position sensors (sensor A, sensor B, and sensor C) for a 4-pole brushless DC motor. The sensors are positioned so that transitions in the sensor signals occur every 60 degrees of electrical rotation, which is every 30 degrees of mechanical shaft rotation for the 4-pole motor. As shown in FIG. 2, the voltages 203 applied to the motor windings are changed in response to the Hall Effect signals 206. By adjusting the applied voltage level, the amount of motor winding current can be varied until the time between commutations is equal to the period of the desired speed. At low speeds, the PID closed loop control becomes problematic due to the limitations of sampling theory. At some point, the transitions (or changes) in the Hall Effect sensor signals are so far apart that the PID control is unable to update the pulse width modulation (PWM) often enough to prevent stalling of the DC motor 103 under load variation.

In time-based commutation, the motor windings are commutated every time a timer with a period corresponding to the period of the desired motor speed expires. The signals from the Hall Effect sensors can be used to monitor speed and/or rotation of the motor. For example, the Hall Effect sensor signals can be examined when the timer expires to verify that the rotor did in fact move during the last commutation cycle. If the motor did not rotate (or rotate sufficiently) to the next Hall Effect position sensor, the energy supplied to the windings can be increased for the next commutation cycle (e.g., by increasing the applied voltage level). If the motor has traveled too far during the commutation cycle, then the energy supplied to the windings can be reduced for the next commutation cycle. When the motor speed increases above the predefined threshold, the closed loop control can transfer back to motion-based commutation.

In some implementations, a first threshold can be defined for the transition from motion-based commutation to time-based commutation and a second threshold (higher than the first threshold) can be defined for the transition from time-based commutation to motion-based commutation. This can avoid excessive cycling between the two control schemes. By switching to the closed loop time-based commutation in response to a comparison of the motor speed with a predefined threshold, seamless transition of the closed-loop control between the motion-based commutation and the time-based commutation is synchronous and can occur every 60 degrees of electrical rotation (or every 30 degrees of shaft rotation for the 4-pole motor). Torque and current limit controls can also be utilized for both motion-based and time-based commutation modes to prevent damage to either the DC motor 103 or the power drive 109 due to real time loading.

If a brushed DC motor is being driven by the universal motor controller 100, two outputs (e.g., MOTA and MOTB) can be used to drive the DC motor 103. Current can be supplied from two connections (e.g., MOTA and MOTB), using voltages 230, and flows through the winding currently connected through the brushes. Feedback from a tachometer of the brushed DC motor can be used to monitor speed of the DC motor 103 for motion-based commutation with voltage applied to the brushes controlling speed. For example, a tachometer utilizing an optical encoder to produce a series of output pulses based upon changes in rotor position can be used to provide speed indications.

Referring back to FIG. 1, the power supply 106 can be designed to provide all voltages needed to commutate the DC motor 103. The power supply 106 can provide four different output voltages: high voltage DC (HVDC) power, high side drive (HSD) power, input/output (I/O) power, and logic power. The HVDC power is used to supply the main drive power for the DC motor 103. The HVDC can be selected by a user using, e.g., a jumper connection, dip switches, or other type of configuration device or programmable setup. For example, the power supply 106 can provide 170 VDC or 340 VDC to drive fractional horsepower DC motors up to 375 W or more. The HSD power provides isolated 18 VDC for the gate drive voltage for the power drive 109. The I/O power provides isolated 18 VDC for the I/O side of the isolation boundaries 115/118. The logic power provides isolated 9 VDC for the MCU 112 and network side of the isolation boundaries 115/118.

In addition to providing the DC operating voltages, the power supply 106 can also include surge suppression, inrush current limiting, and/or switched output voltages. Because of the large AC line load changes that can be encountered in the industrial environment, protection for brownout and/or overvoltage conditions can be incorporated into the power supply 106. Protection from AC input surges and/or overvoltage conditions can be provided by fuses, transient voltage suppressors (transorbs), and/or variable resistors (varistors).

In addition, if not limited, inrush currents in excess of 110 A can be generated because of the large capacitance needed to filter a 375 W load. To limit inrush without reducing input voltage or dissipating steady state power, an active inrush limiter can be employed. For example, the power supply 106 can utilize a wire wound resistor to limit the inrush current until the AC input voltage is stable and falls within a defined specification. The power supply 106 can monitor the AC input voltage to determine whether the input has stabilized and, based upon the determination, provide an AC input voltage valid signal to control the use of the inrush limiter (e.g., the wire wound resistor). When the AC input voltage has stabilized, the inrush limiter can be removed (e.g., the resistor can be shunted by a triac) in response to the AC input voltage valid signal.

The AC input voltage valid signal can also be used to control the supply of the DC output voltages to the rest of the power supply 106. This arrangement guarantees that the AC and DC voltage levels are valid in order for the power drive 109 to try to operate. This configuration can ensure that all DC output voltages supplied by the power drive 109 switch simultaneously and only when stable.

Figure 3A:
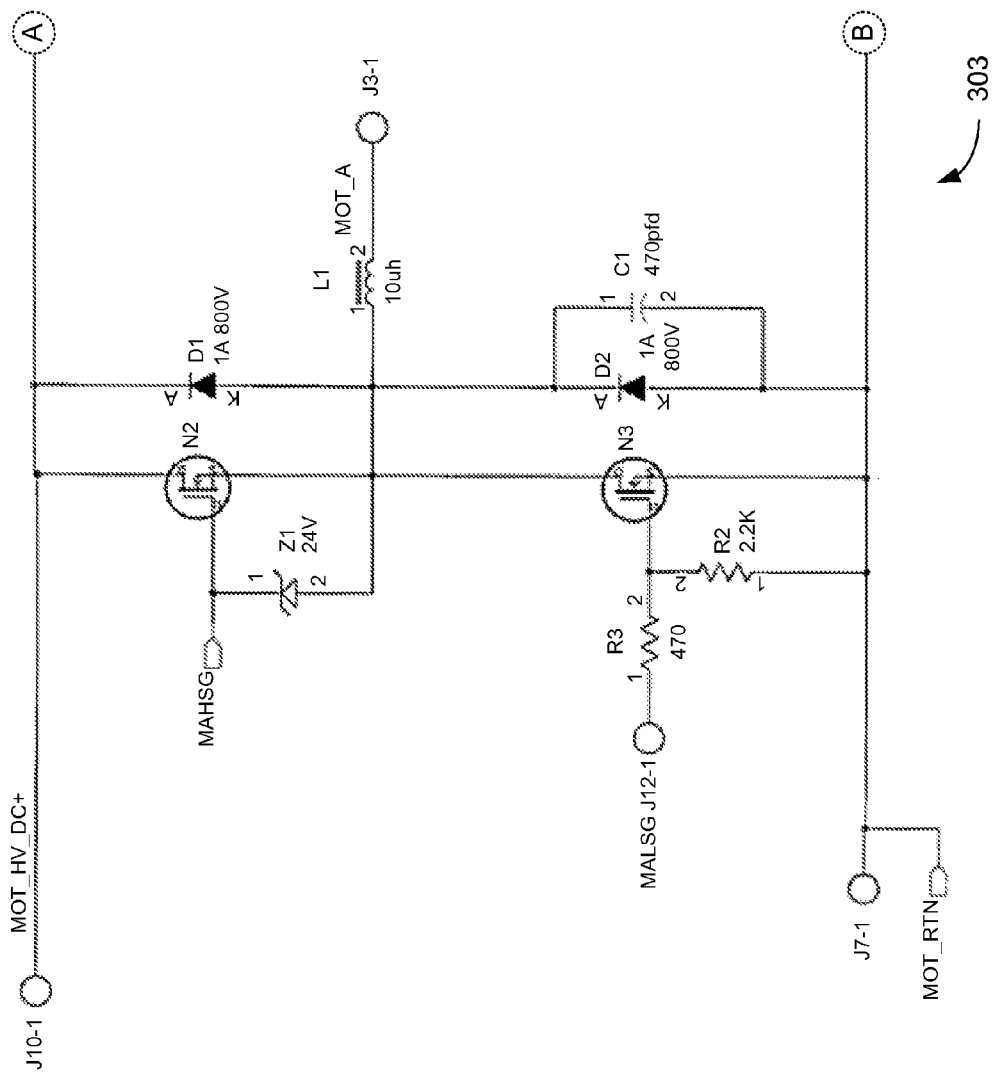
FIGS. 3A-3B and 3C-3D are schematic diagrams illustrating examples of circuitry in a power drive of the universal motor controller of FIG. 1 in accordance with various embodiments of the present disclosure.
Figure 3B:
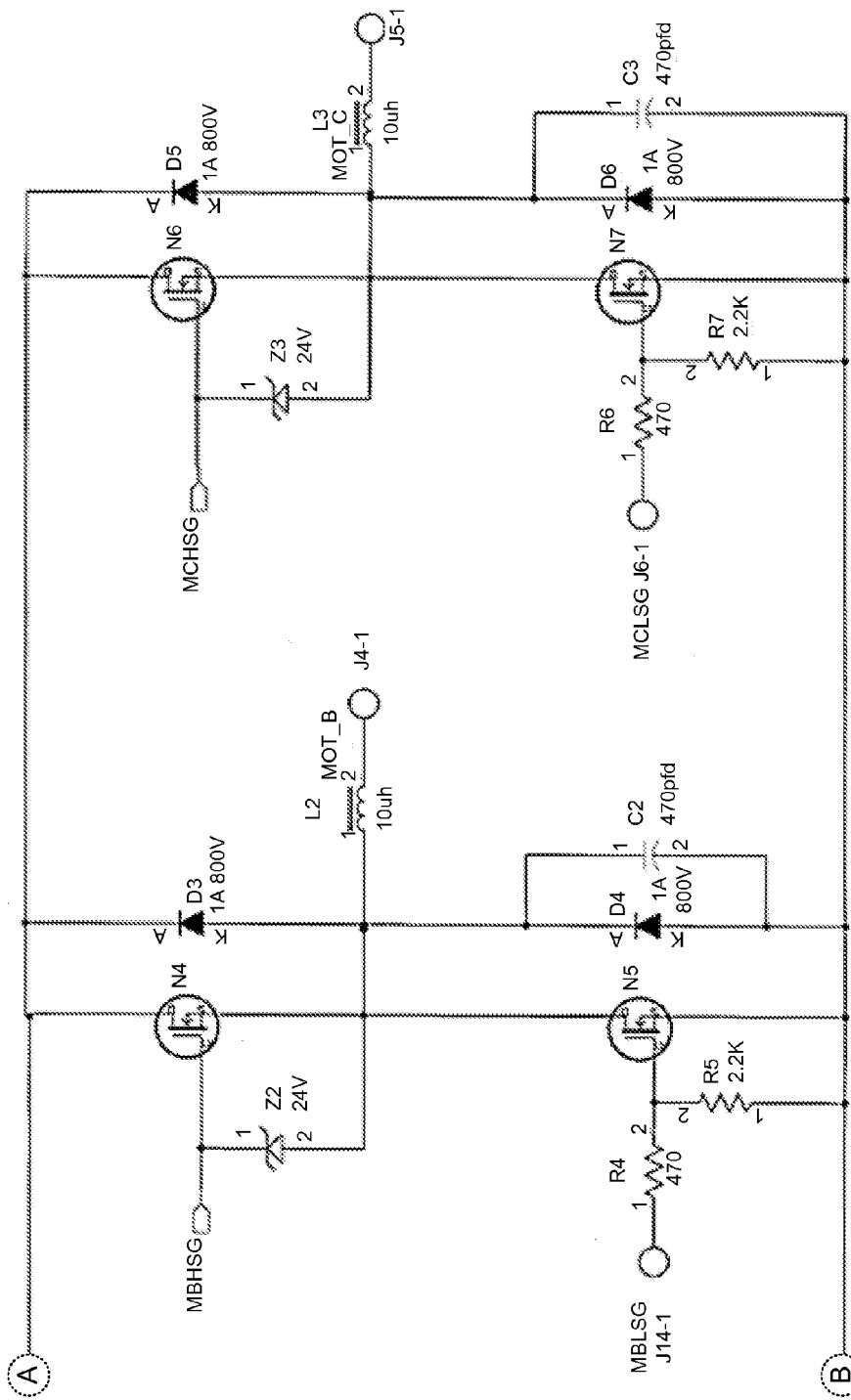
Figure 3C:
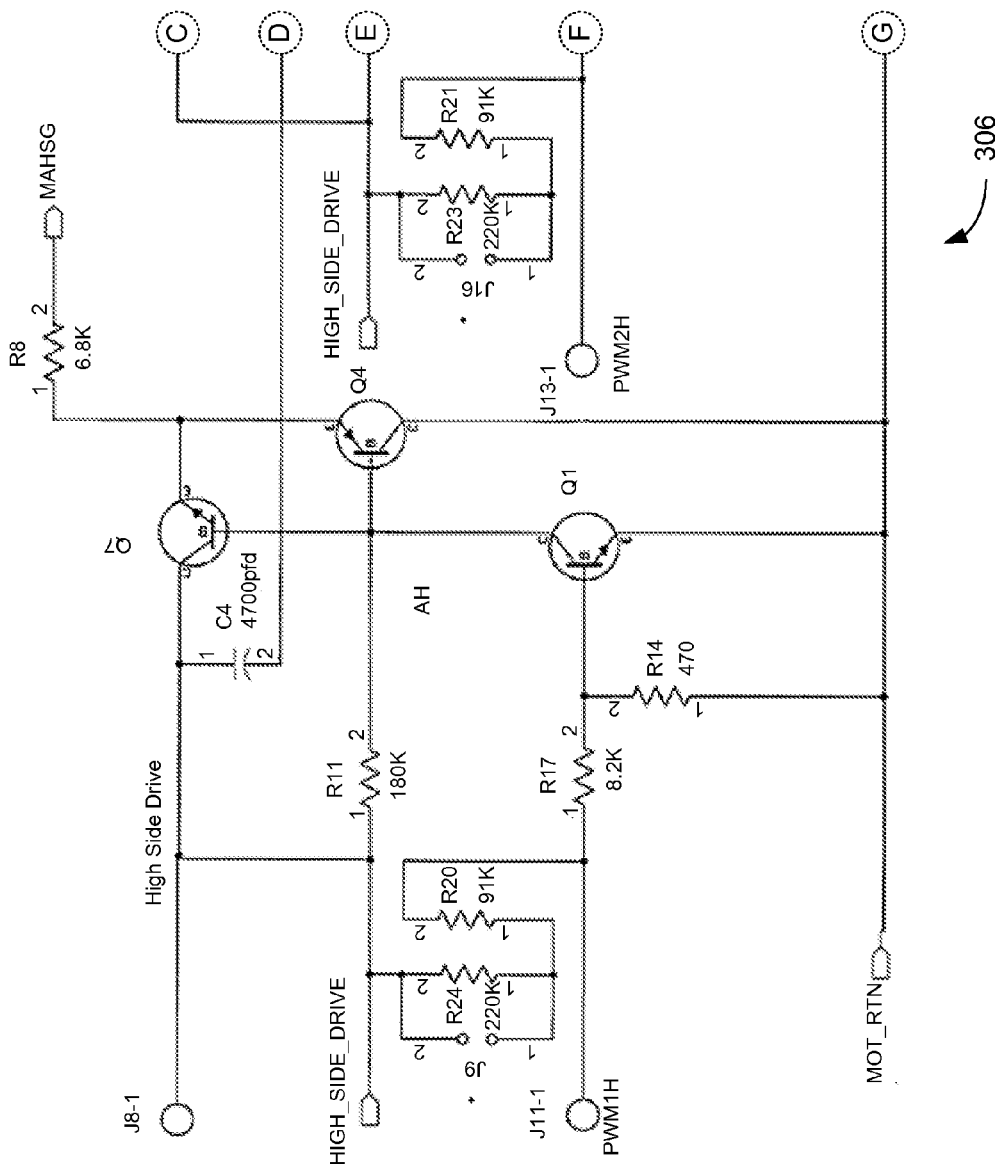
Figure 3D:
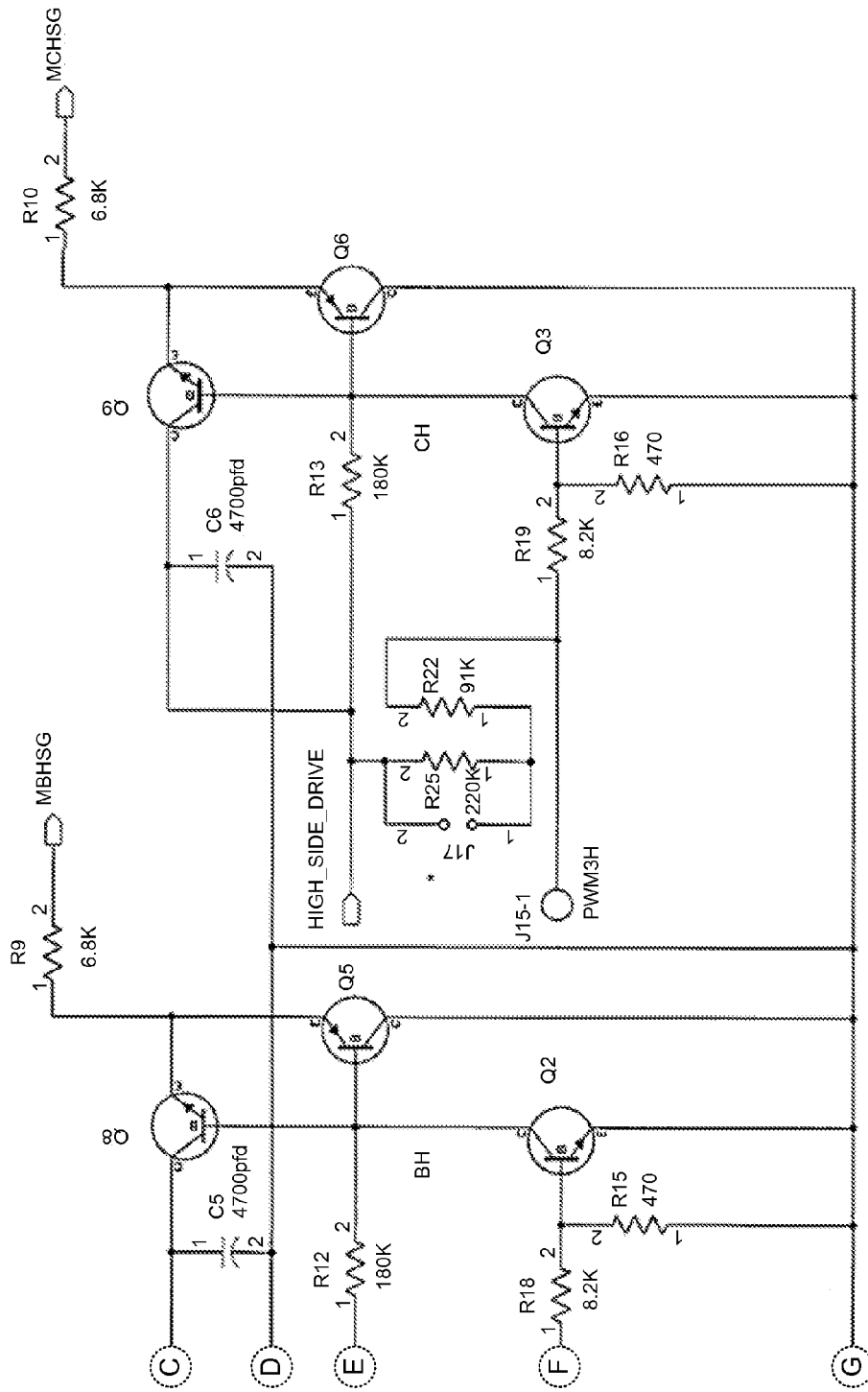

FIGS. 3A-3B and 3C-3D show schematic diagrams of circuitry used in an example of the power drive 109. FIGS. 3A-3B show an example of high power drive circuitry 303 for switching the HVDC power to drive the DC motor 103 (FIG. 1). As depicted in FIGS. 3A-3B, the drive circuitry 303 is sized for 375 W to drive a 0.5 HP motor. The drive circuitry 303 can be located on a separate circuit board and can be sized for motors up to 1 HP (750 W) or larger. FIGS. 3C-3D illustrate an example of gate drive circuitry 306 for the transistors of the high power drive circuitry 303. The low side field effect transistors (FETs) can be directly driven via the output isolation boundary 115 (FIG. 1), which is suitable for driving large capacitive loads with a 3-18 V operating range. The high side FET gate drive voltage is translated to the +18 VDC of the isolated HSD power by the circuitry of FIGS. 3C-3D. FET selection and gate drive characteristics can be implemented to provide or optimize dV/dt immunity.

Figure 4A:
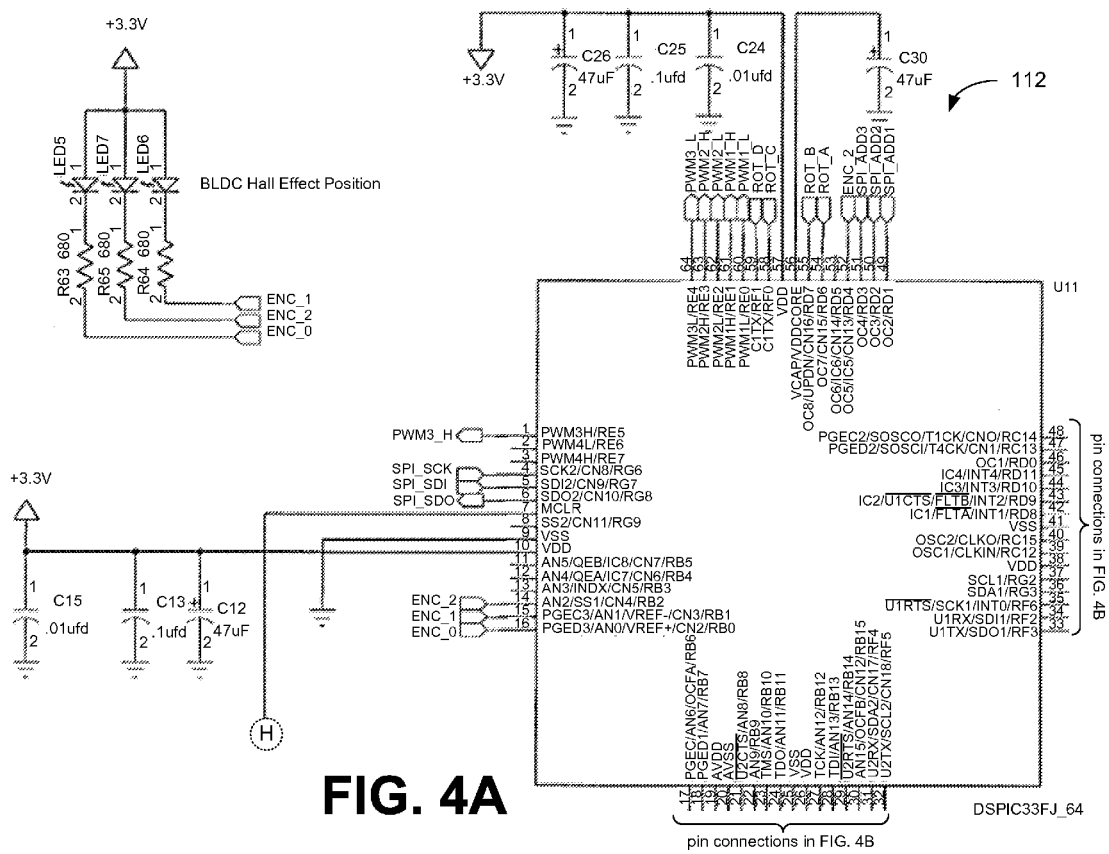
FIGS. 4A-4B is a schematic diagram illustrating an example of circuitry in a micro control unit (MCU) of the universal motor controller of FIG. 1 in accordance with various embodiments of the present disclosure.
Figure 4B:
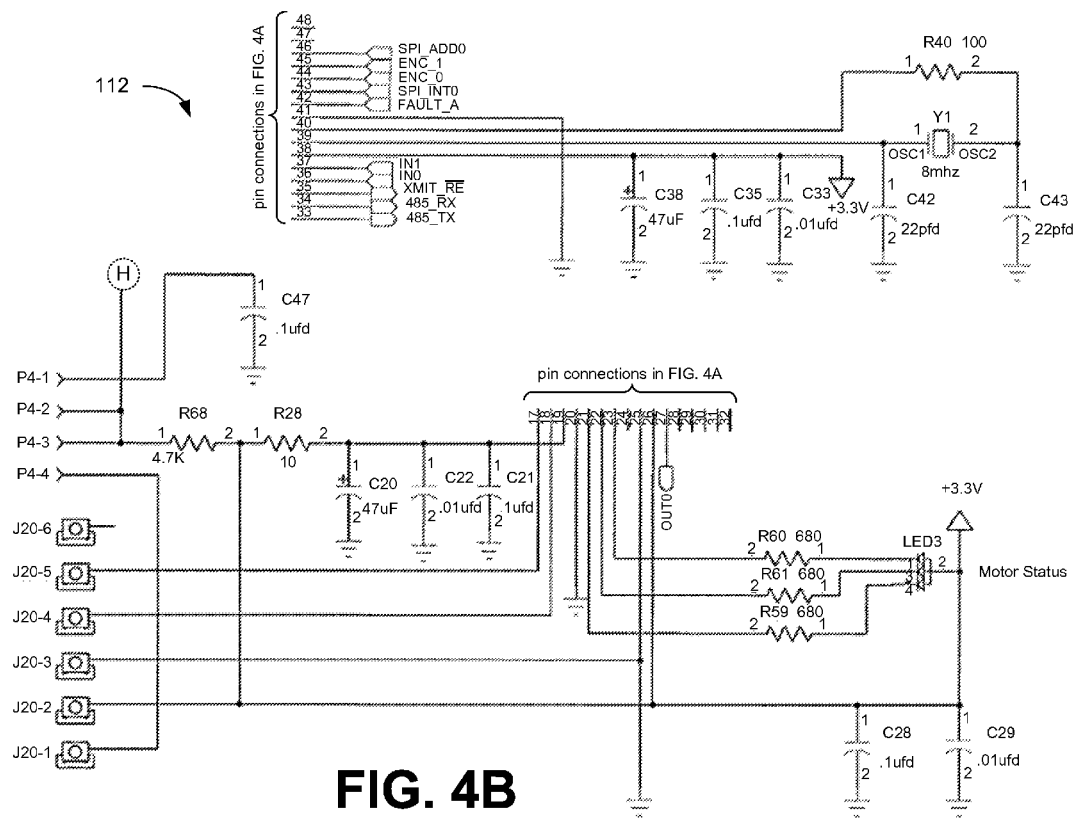

The universal motor controller 100 utilizes the MCU 112 (FIG. 1) to implement data acquisition and control functions of the universal motor controller 100. Functions performed by the MCU 112 will be described in more detail below. FIGS. 4A-4B show a schematic diagram of an example of an MCU 112 configuration. The MCU 112 can include a microprocessor capable of processing up to 40 million instructions per second (MIPS) or more. The microprocessor can also include a hardware PWM motor control (or pulse width modulator) integrated on the chip. As configured in the example of FIGS. 4A-4B, the MCU 112 can provide a minimum of 11.28 bits of PWM resolution.

Figure 5A:
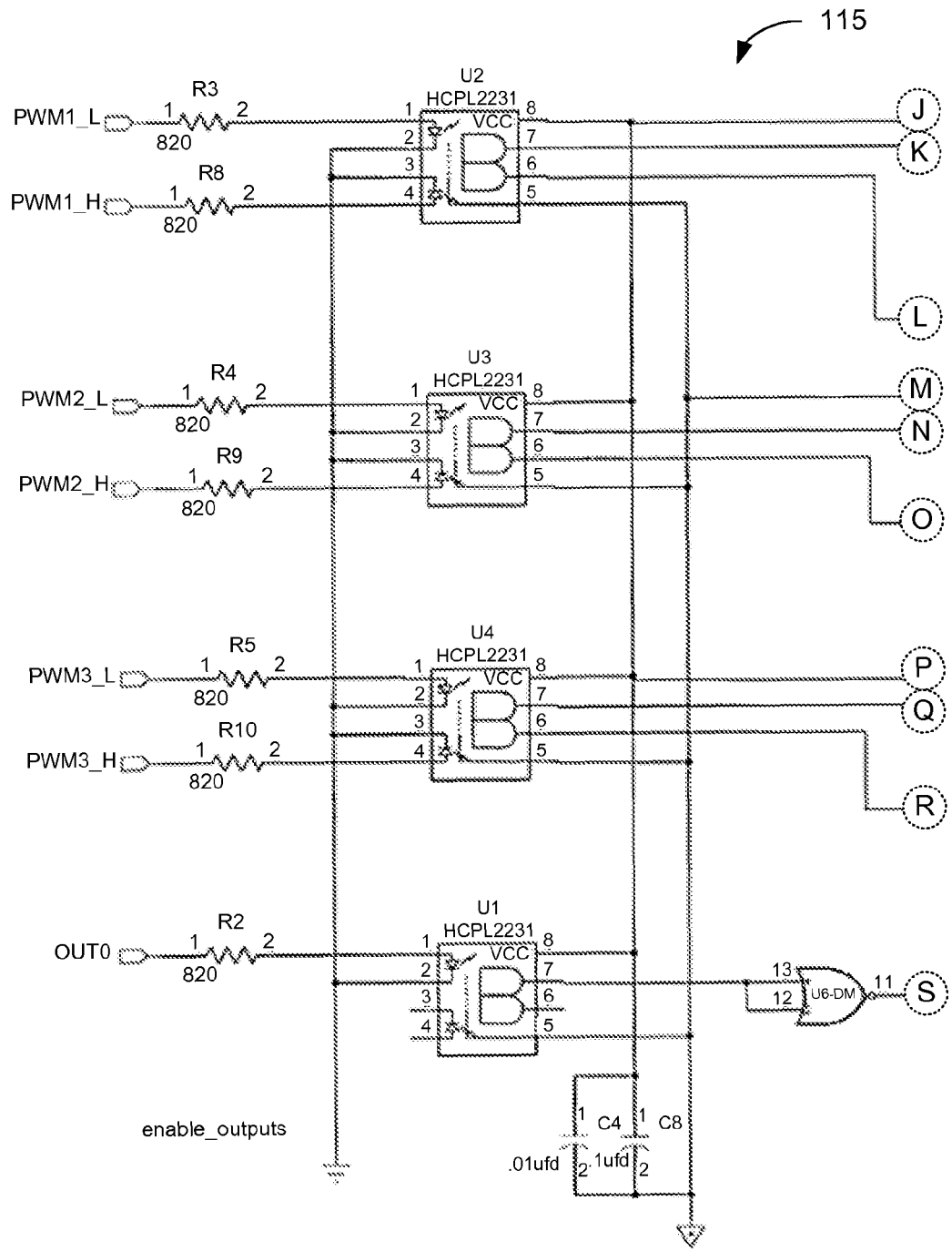
FIGS. 5A-5B is a schematic diagram illustrating an example of circuitry in an output isolation boundary of the universal motor controller of FIG. 1 in accordance with various embodiments of the present disclosure.
Figure 5B:
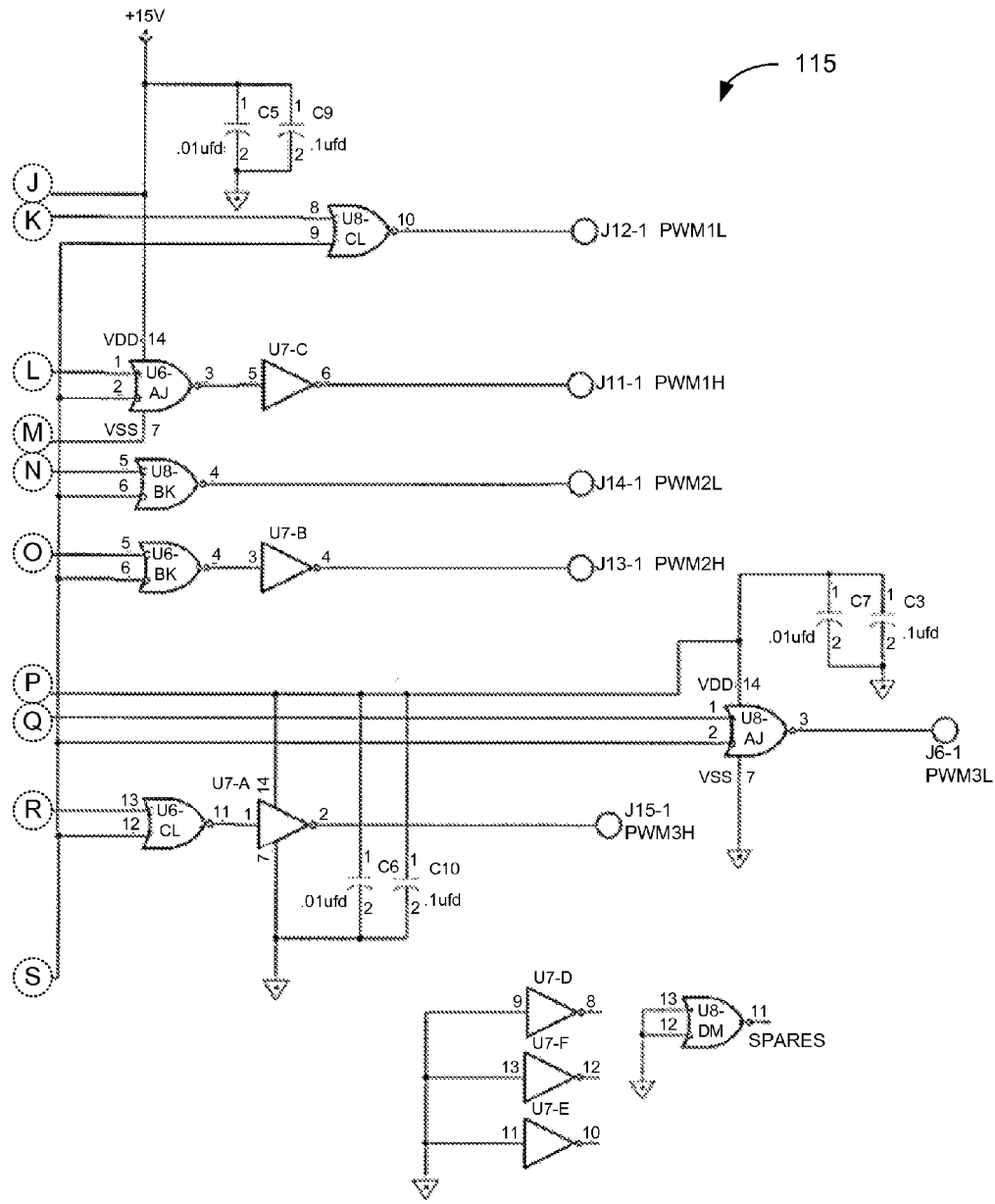

The output isolation boundary 115 and input isolation boundary 118 of FIG. 1 provides electrical isolation between the higher operating voltages of the DC motor 103 and power drive 109 and the lower operating voltages of the MCU 112 and interfaces 127/130. FIGS. 5A-5B show a schematic diagram of an example of an output isolation boundary 115. Each output provides 2.5 kV of optical isolation between the MCU 112 (FIGS. 4A-4B) and the gate drive circuitry 306 (FIGS. 3C-3D). There are six outputs from the PWM of the MCU 112 (three high and three low): PWM1H, PWM1L, PWM2H, PWM2L, PWM3H, and PWM3L. These six outputs drive the FET's connected in a totem pole configuration of the power drive 109 as shown in FIGS. 3A-3B. Each of the three totem poles is center tapped to provide connections for the three motor windings of a brushless DC motor: motor A (MOTA), motor B (MOTB), and motor C (MOTC). Current is sourced from one phase and sunk by a different phase to energize one of three motor windings in the brushless DC motor. FIG. 2 illustrates the relationship of the voltage application to the motor windings (MOTA, MOTB and MOTC) and the signals from the Hall Effect position sensors (sensor A, sensor B and sensor C). As discussed above, a brushed DC motor utilizes two of the connections (e.g., MOTA and MOTB).

Figure 6A:
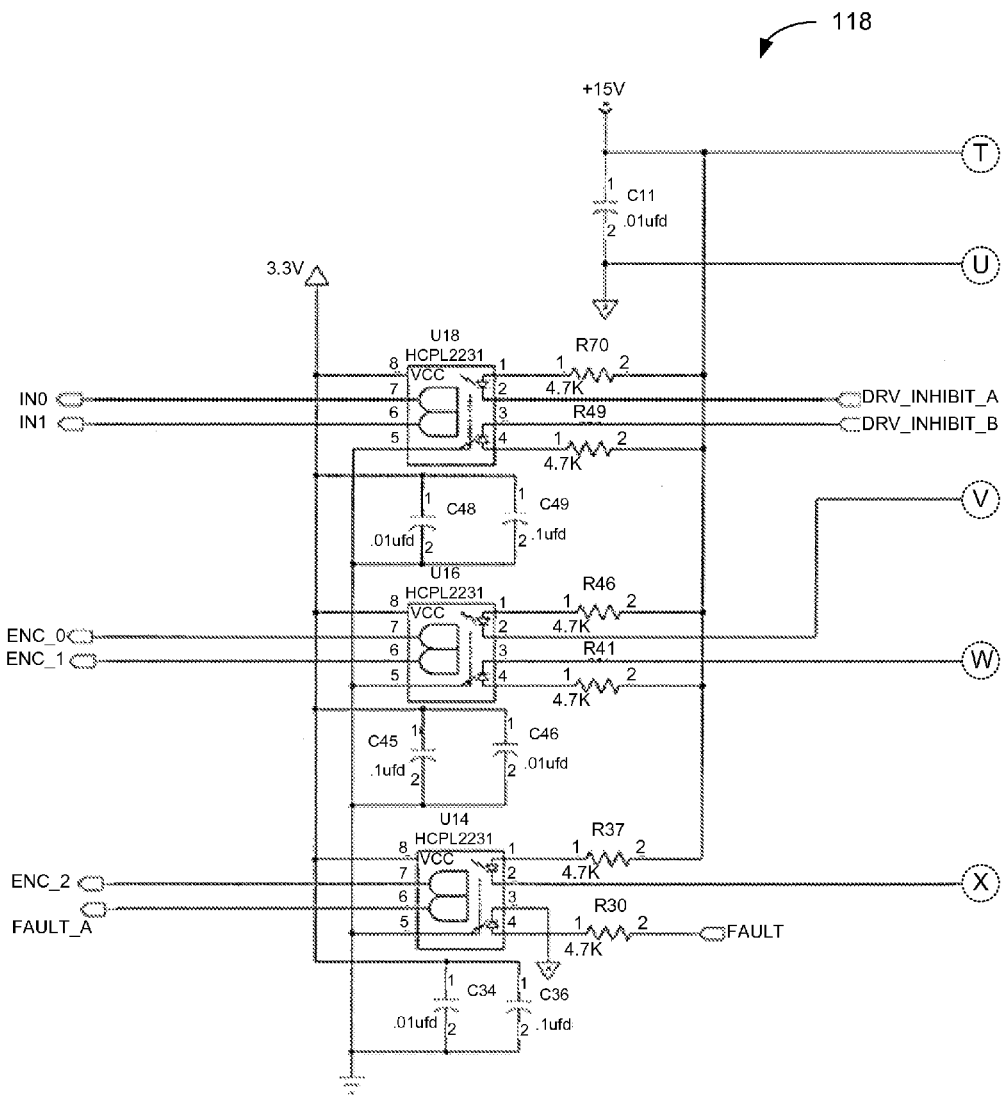
FIGS. 6A-6B is a schematic diagram illustrating an example of circuitry in an input isolation boundary of the universal motor controller of FIG. 1 in accordance with various embodiments of the present disclosure.
Figure 6B:
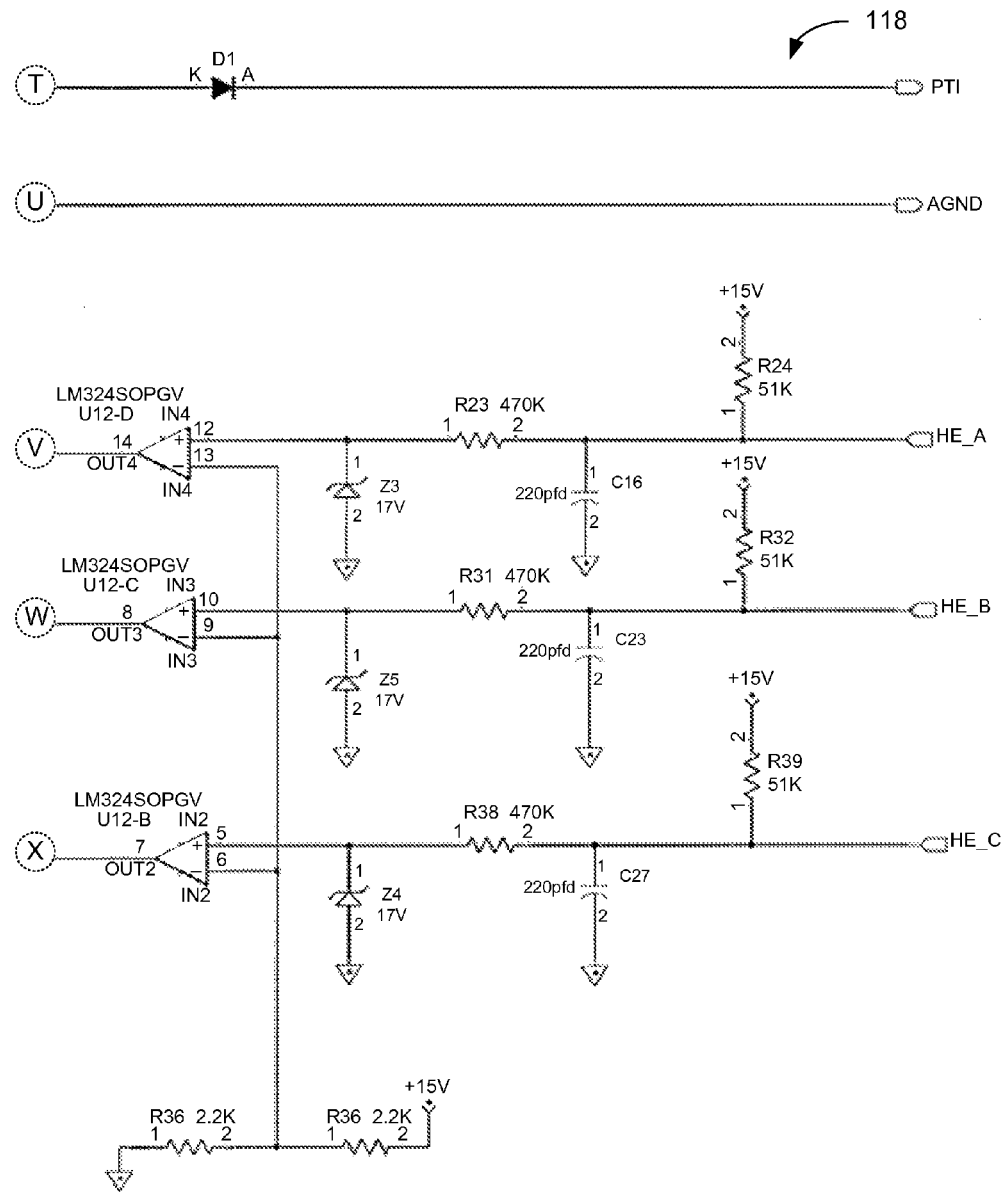

FIGS. 6A-6B show a schematic diagram of an example of an input isolation boundary 118. There are six inputs associated with the DC motor 103 (FIG. 1): Inhibit A, Inhibit B, Hall A/Tach, Hall B, Hall C, and Fault. The two inhibit inputs and three hall inputs are all digital inputs to the MCU which are capable of generating an interrupt to the MCU on a state change. The inputs can be used to identify motor types and sense rotor speed and/or location. The Inhibit A and Inhibit B inputs can be used to check for an attached motor. The Hall A, Hall B and Hall C inputs are used for acquisition of the signals from the Hall Effect sensors in a brushless DC motor 103. The Hall A (Tach) input can be used when a tachometer signal is provided for a brushed DC motor. For example, if both Inhibit A and Inhibit B are inactive, then no motor is attached. If Inhibit A is active, then a brushless motor is attached and Hall A, Hall B and Hall C are used to determine rotor speed and location. In some implementations, Inhibit A in combination with Hall A, Hall B and Hall C can be used to indicate the size of the brushless motor. For instance, if Inhibit A is active, then a 0.5 HP brushless DC motor is connected. However, if Inhibit A is inactive and Hall A, Hall B and Hall C return a valid rotor position, then a 0.25 HP brushless DC motor is connected.

If Inhibit B is active, then a brushed motor is attached. In this case, Hall A provides a tachometer input from the motor, which is used to determine motor speed. Hall B and Hall C are unused, but could be used to define one of four brushed motors. If both Inhibit A and Inhibit B are active, then a fault condition exists. The Fault input is used to receive fault indications from the current limiter 121 (FIG. 1). These inputs can be exposed to high voltage if a field wiring problem exists. Each input provides 2.5 kV of optical isolation between the field wiring of the DC motor 103 and the MCU 112. All inputs can be current limited so fault conditions will not damage the Hall Effect inputs.

When a brushless motor is attached to the universal motor controller 100, the rotor position is determined based upon the Hall Effect sensor signals via the Hall A, Hall B, and Hall C inputs. These Hall Effect sensor signals can also be used to calculate speed. The amount of time between signal transitions can be measured by a 32-bit hardware counter with a granularity of 100 ns. The rotations per minute (RPM) are then calculated as distance over time. Twelve speed calculations per revolution can be carried out in the closed loop motion-based commutation mode using PID control. Speed calculations are not required for the closed loop time-based commutation mode, but may still be determined.

When a brushed motor is attached to the universal motor controller 100, a tachometer is utilized for the closed loop operations. The tachometer is attached to the Hall A (Tach) input. The amount of time for a set number of pulses is measured with the 32-bit hardware counter with a granularity of 100 ns. The RPM is calculated as distance over time. Two speed calculations per revolution can be carried out in the closed loop time-based commutation mode.

Figure 7:
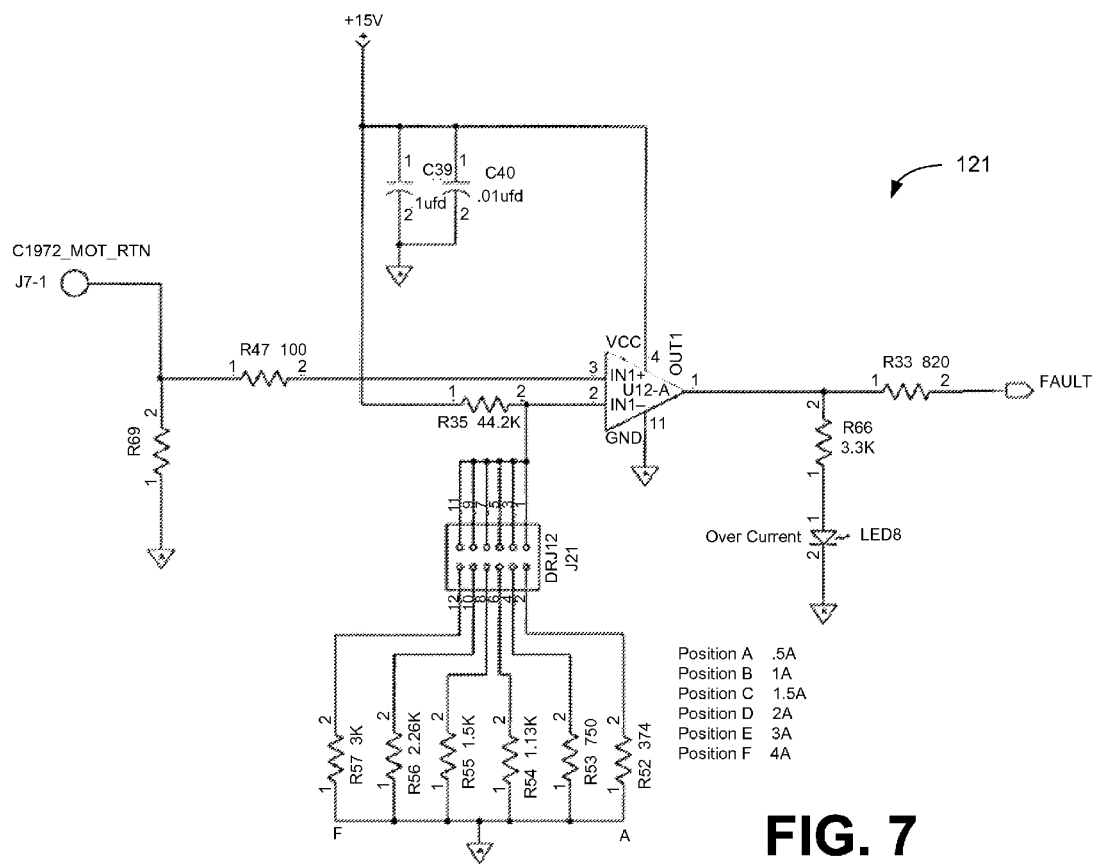
FIG. 7 is a schematic diagram illustrating an example of circuitry in a current limiter of the universal motor controller of FIG. 1 in accordance with various embodiments of the present disclosure.

Whether connected to a brushless or brushed DC motor; all motor winding current returns to the power supply 106 (FIG. 1) via the HVDC common. To provide a current limit indication, the current returns through a resistor (R89) as shown in the schematic diagram of an example of a current limiter 121 in FIG. 7. This results in a pulse width modulated IR drop that is directly proportional to the load. The voltage developed across the resistor (R89) is then compared to a reference voltage generated by a selectable voltage divider, which can be configured using a jumper, dip switch or other appropriate configuration means. If the load contingent voltage drop across the resistor (R89) exceeds the voltage developed by the selectable voltage divider, a hardware fault is presented to the PWM hardware of the MCU 112. How the fault is handled is determined by the configuration of the MCU 112 (e.g., based upon hardware configuration registers). An MCU interrupt request (IRQ) is also generated by the fault. The fault interrupt handler will resolve the fault in response to the IRQ, if possible. However, if the fault is not reconciled within a predefined time limit (e.g., twenty seconds), a current limit shutdown will occur.

Watchdog timers 124 (FIG. 1) can be used by the MCU 112 to various control functions. For example, two hardware timers and one software timer can be utilized to monitor operation of the universal motor controller 100. The first hardware timer can be used to control a reset when a predefined period expires after the universal motor controller 100 transitions to an idle mode. If the universal motor controller 100 does not return to the idle state before the first timer expires, a fault recovery is triggered. The second hardware timer may be dynamic. Its timer period can be reset every time there is a commanded motor speed change. The timer period is derived from the desired set speed. If the second hardware timer expires between Hall Effect transitions (or interrupts), a motor stall protocol is initiated. The software timer can be used to monitor command network activity in the universal motor controller 100. If no activity is sensed on the network over a twenty second time period, a running motor will be stopped and any digital I/O bits set over its SPI bus will be returned to their reset state.

Commands executed by the universal motor controller 100 are sent to the MCU 112 over a network interface 127 connected to, e.g., a multidrop RS485 network. For example, the commands can be defined in the PCCNet smart card protocol specification. Other types of command protocols may also be used as can be understood. The network interface 127 can be connected to a universal asynchronous receiver/transmitter (UART) of the MCU 112. When a character is received via the network interface 127, an interrupt is generated. An industry standard serial peripheral interface (SPI) 130 (FIG. 1) can also be present for high speed serial communications. Speeds of up to two megabits per second can be achieved. The SPI interface is programmed to control digital I/O bits as defined in the PCCNet smart card protocol specification.

Functionality of the universal motor controller 100 can be defined by software, which can be compiled and programmed into the universal motor controller 100 as firmware. When implemented by the MCU 112, the firmware (or software) can monitor and control all facets of the universal motor controller 100 operation, and by extension the DC motor 103 operation. Operation of a brushless DC motor can be controlled over a range from about 16.5 RPM to about 3300 RPM.

Closed loop control from about 99 RPM to about 3300 RPM is carried out using the PID control of the motion-based commutation and closed loop control below 99 RPM utilizes time-based commutation. For a brushed DC motor, closed loop control from 99 RPM to about 3000 RPM is carried out using the PID control of the motion-based commutation.

Figure 8A:
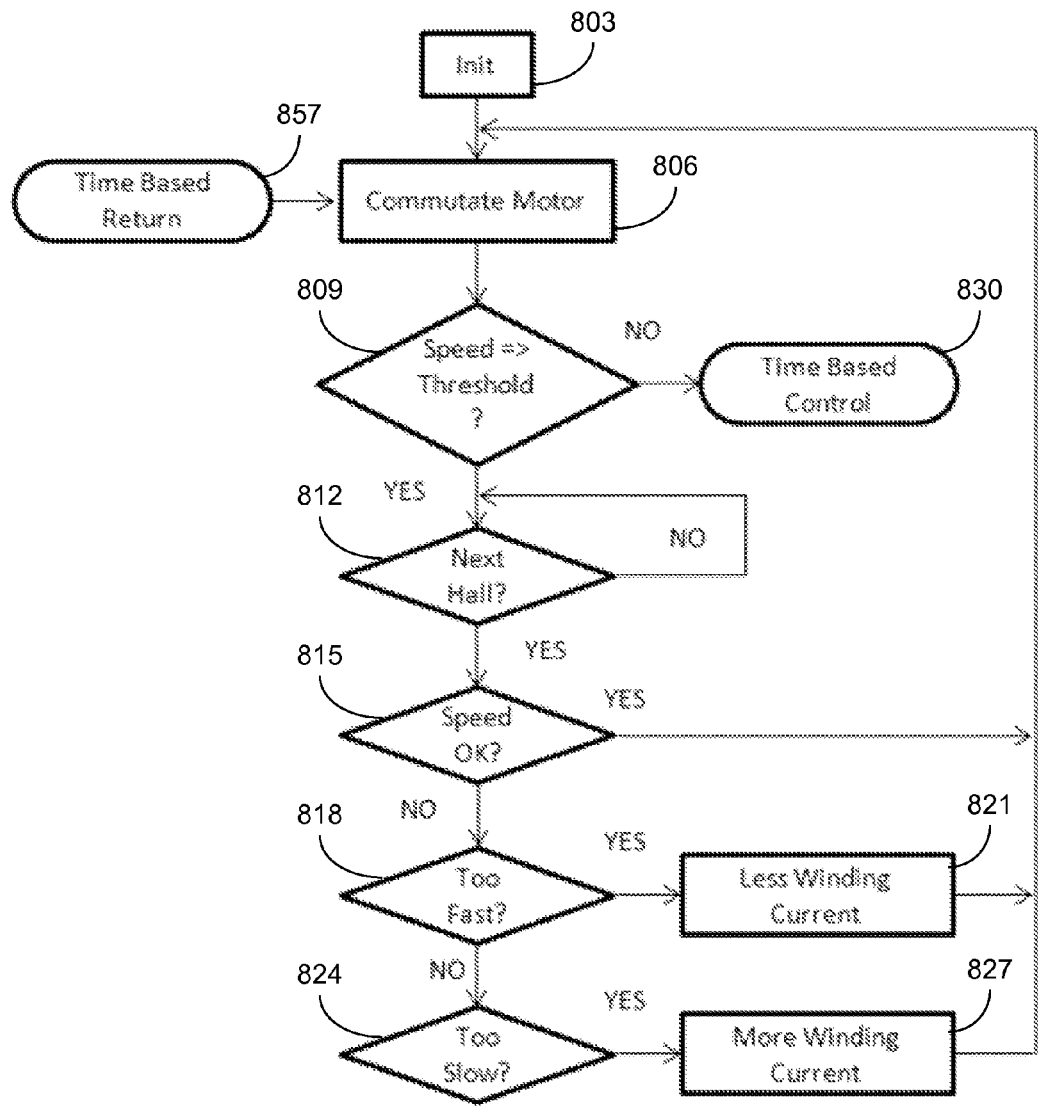
FIGS. 8A and 8B show a flowchart illustrating an example of the operation of the universal motor controller of FIG. 1 in accordance with various embodiments of the present disclosure.
Figure 8B:
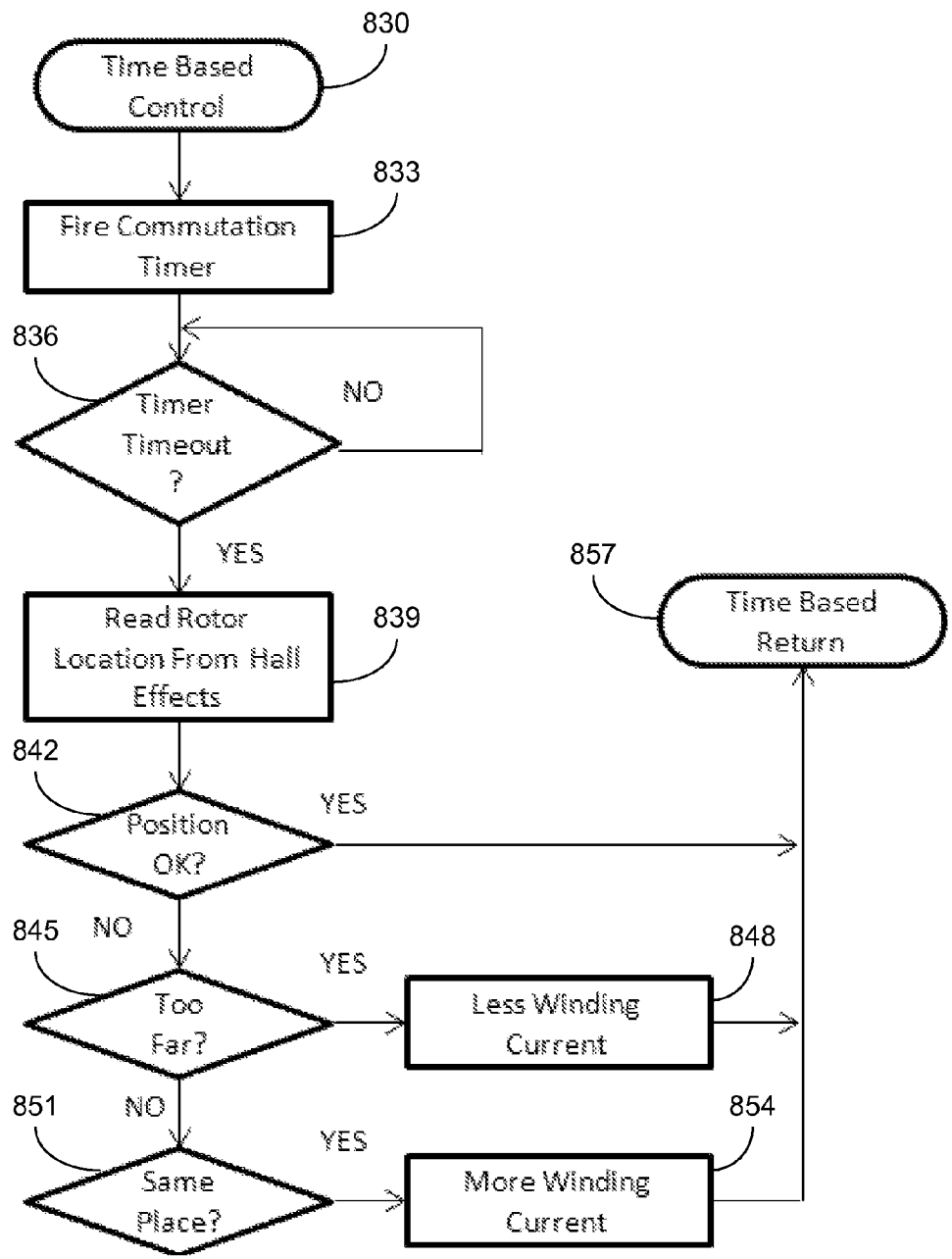

Referring next to FIGS. 8A and 8B, shown is a flowchart that provides one example of the brushless operation of the universal motor controller 100 in accordance with various implementations of the current disclosure. It is understood that the flowchart of FIGS. 8A and 8B provides merely an example of the many different types of functional arrangements that may be employed to implement the operation of the universal motor controller 100 as described herein. As an alternative, the flowchart of FIGS. 8A and 8B may be viewed as depicting an example of steps of a method implemented by the universal motor controller 100 according to one or more brushless implementations.

Beginning with 803 in FIG. 8A, closed loop control of the DC motor 103 (FIG. 1) is initiated in a motion-based commutation mode. At 806, the DC motor 103 is commutated by switching the voltage supplied by the power drive 109 (FIG. 1). The MCU 112 (FIG. 1) controls the commutation of the DC motor 103 based upon indications from sensors of the DC motor 103. For a brushless DC motor, signals are provided by Hall Effect sensors in the DC motor 103 via the input isolation boundary 118 (FIG. 1). The MCU 112 controls switching of the power drive 109 via the output isolation boundary 115 (FIG. 1). FIG. 2 illustrates an example of the relationship between voltage 203 applied to the motor windings (MOTA, MOTB and MOTC) and signals 206 from the Hall Effect position sensors (sensor A, sensor B, and sensor C) for a 4-pole brushless DC motor. For a brushed DC motor, a signal is provided by a tachometer on the DC motor 103 via the input isolation boundary 118.

In response to the commutation at 806, the speed of the DC motor 103 is compared to a predefined threshold value at 809. The motor speed can be determined based upon the time intervals between transitions of the Hall Effect sensors or pulses from the tachometer. If the speed of the DC motor 103 is greater or equal to the predefined threshold, the motion-based commutation using the PID control is maintained and it is determined whether the next Hall Effect sensor has been reached at 812. At the end of each phase increment, an interrupt is generated when the next Hall Effect sensor is reached. For a 4-pole motor, interrupts can be generated every 30 degrees of shaft rotation. If not, then the MCU 112 continues monitoring to determine when the Hall Effect sensor has been reached. If the interrupt has been detected, the speed of the DC motor 103 is checked at 815 by, e.g., comparing the motor speed with a desired speed. The desired speed may be based upon a user input communicated to the MCU 112 via the network interface 127 or other appropriate input means. If the speed is acceptable in 815, then the flow returns to 806 where the DC motor 103 is commutated again.

If the motor speed is too fast at 818, then the winding current is reduced at 821 and the flow returns to 806. Reducing the winding current reduces the generated torque of the DC motor 103, causing the motor to slow down. Current can be reduced by using a lower supply voltage or a shorter "on" period for the power drive transistors. If the motor speed is too slow at 824, then the winding current is increased at 827 and the flow returns to 806. Increasing the winding current increases the generated torque of the DC motor 103, causing the motor to speed up. Current can be increased by using a higher supply voltage or a longer "on" period for the power drive transistors. As long as the motor speed remains at or above the threshold value, the universal motor controller 100 continues to operate in the motion-based commutation mode with PID control.

When the motor speed fall below the predefined threshold value at 809, the closed loop control shifts to the time-based commutation mode at 830. Referring now to FIG. 8B, in the time-based commutation mode the commutation timer is started at 833. At 836, the commutation timer is monitored until the timeout indication is detected. In response to the timeout indication, the rotor location is determined in 839. For a brushless DC motor, this can be based upon the signals from the Hall Effect sensors. If the rotor position is acceptable at 842, then the flow returns to FIG. 8A via 858, where the DC motor 103 is commutated again at 806 and the motor speed is again compared to the predefined threshold value at 809. If the speed of the DC motor 103 remains below the threshold value, then the flow returns to FIG. 8B via 830, where the time-based commutation mode continues. If the motor speed is equal to or greater than the predefined threshold, than the motion-based commutation mode is resumed and flow passes to 812.

If the rotor position is not acceptable at 842, then the universal motor controller 100 corrects for the misalignment. If the rotor position has advanced too fast at 845, then the winding current is reduced at 848 and the flow returns to FIG. 8A via 858 as described above. Reducing the winding current reduces the generated torque of the DC motor 103, reducing the amount of shaft rotation during the time interval. Current can be reduced by using a lower supply voltage or a shorter "on" period for the power drive transistors. If the rotor position has not advanced enough at 851, then the winding current is increased at 854 and the flow returns to FIG. 8A via 858 as described above. Increasing the winding current increases the generated torque of the DC motor 103, causing the motor to rotate more during the time interval of produce enough torque or overcome the counter torque of the load. Current can be increased by using a higher supply voltage or a longer "on" period for the power drive transistors.

In some implementations, the threshold value may vary based on the current operational mode of the universal motor controller 100. For example, a first threshold value may be used to determine whether to transition from the motion-based commutation mode to the time-based commutation mode and a second threshold value may be used to determine whether to transition from the time-based commutation mode to the motion-based commutation mode at 809 of FIG. 8A. The value of the threshold may be based upon the commutation mode of the previous time period. This allows for a hysteresis effect to prevent excessive cycling between the motion-based and time-based commutation modes. In addition, while 809 of FIG. 8A indicates transitioning from the motion-based commutation mode to the time-based commutation mode when the motor speed is less than the threshold value, in other implementations the transition may occur when the motor speed is equal to or less than the threshold value. Other variations may also be possible as can be appreciated.

With reference back to FIG. 1, shown is a schematic block diagram of the universal motor controller 100 according to an implementation of the present disclosure. The universal motor controller 100 includes a MCU 112 having at least one processor circuit, for example, having a processor and a memory, both of which can be coupled to a local interface. The local interface may comprise, for example, a data bus with an accompanying address/control bus or other bus structure as can be appreciated. Certain embodiments of the present disclosure can be implemented in hardware, software, firmware, or a combination thereof. In one embodiment, the functionality of the universal motor controller 100 is implemented in firmware that is stored in a memory and that is executed by a processor circuit.

Stored in the memory are both data and several components that are executable by the processor. In particular, stored in the memory and executable by the processor are a motor control application and potentially other applications. Also stored in the memory may be a data store and other data. In addition, an operating system may be stored in the memory and executable by the processor. It is understood that there may be other applications that are stored in the memory and are executable by the processor as can be appreciated. Where any component discussed herein is implemented in the form of software, any one of a number of programming languages may be employed such as, for example, C, C++, C#, Objective C, Java®, JavaScript®, Pen, PHP, Visual Basic®, Python®, Ruby, Flash®, or other programming languages.

A number of software components are stored in the memory and are executable by the MCU 112. In this respect, the term "executable" means a program file that is in a form that can ultimately be run by the processor. Examples of executable programs may be, for example, a compiled program that can be translated into machine code in a format that can be loaded into a random access portion of the memory and run by the processor, source code that may be expressed in proper format such as object code that is capable of being loaded into a random access portion of the memory and executed by the processor, or source code that may be interpreted by another executable program to generate instructions in a random access portion of the memory to be executed by the processor, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Although the universal motor controller 100 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 8A and 8B show the functionality and operation of implementations of portions of the universal motor controller 100. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the MCU 112, a processor in a computer system or other system. The machine code may be converted from the source code, etc. If embodied in hardware, each block may represent a circuit or a number of interconnected circuits to implement the specified logical function(s).

Although the flowcharts of FIGS. 8A and 8B show a specific order of execution, it is understood that the order of execution may differ from that which is depicted. For example, the order of execution of two or more blocks may be scrambled relative to the order shown. Also, two or more blocks shown in succession in FIGS. 8A and 8B may be executed concurrently or with partial concurrence. Further, in some implementations, one or more of the blocks shown in FIGS. 8A and 8B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the universal motor controller 100, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A system for control of direct current (DC) motors, comprising:
    a power drive coupled to a brushless DC motor; and
    a micro control unit (MCU) configured to control commutation of the brushless DC motor based upon shaft speed of the brushless DC motor, where the MCU transitions between a motion-based commutation mode and a time-based commutation mode in response to a comparison of the shaft speed with a predefined threshold, where in the time-based commutation mode a rotor position is determined in response to expiration of a timer having a period corresponding to a desired shaft speed and current supplied to the brushless DC motor is adjusted based upon the rotor position of the brushless DC motor determined at the expiration of the timer.

2. The system of claim 1, wherein the time-based commutation mode commutates the brushless DC motor in response to expiration of the timer having the period corresponding to the desired shaft speed.

3. The system of claim 1, wherein the rotor position is based upon signals from Hall Effect sensors of the brushless DC motor.

4. The system of claim 3, further comprising an input isolation boundary configured to isolate outputs of the Hall Effect sensors from the MCU.

5. The system of claim 1, wherein the current supplied to the brushless DC motor is increased in response to an insufficient change in the rotor position.

6. The system of claim 1, further comprising an output isolation boundary configured to isolate outputs of the MCU from gate drive circuitry of the power drive.

7. The system of claim 1, further comprising a current limiter configured to provide an indication to the MCU that load current exceeds a predefined limit.

8. The system of claim 7, wherein the current limiter comprises a selectable voltage divider to set the predefined limit.

9. The system of claim 1, wherein the motion-based commutation mode commutates the brushless DC motor in response to a predefined change in rotor position of the brushless DC motor.

10. The system of claim 9, wherein the commutation of the brushless DC motor is in response to a transition in a signal from a Hall Effect sensor of the brushless DC motor.

11. The system of claim 1, wherein the system is further configured to control commutation of a brushed DC motor when coupled to the power drive.

12. A system for control of direct current (DC) motors, comprising:
    a power drive coupled to a brushless DC motor;
    a micro control unit (MCU) configured to control commutation of the brushless DC motor based upon shaft speed of the brushless DC motor, where the MCU transitions between a motion-based commutation mode and a time-based commutation mode in response to a comparison of the shaft speed with a predefined threshold; and
    a watchdog timer configured to initiate a motor stall protocol if the watchdog timer expires before a next Hall Effect signal transition occurs, where the watchdog timer is reset at a Hall Effect signal transition preceding the next Hall Effect signal transition, the Hall Effect signals from at least one Hall Effect sensor of the brushless DC motor.

13. The system of claim 12, wherein the time-based commutation mode commutates the brushless DC motor in response to expiration of a commutation timer having a period corresponding to a desired shaft speed.

14. The system of claim 12, wherein the motion-based commutation mode commutates the brushless DC motor in response to a predefined change in rotor position of the brushless DC motor, wherein the predefined change in rotor position is based upon signals from the at least one Hall Effect sensor of the brushless DC motor.

15. A method, comprising:
    commutating, in a motion-based commutation mode, a brushless DC motor by switching a power drive coupled to the brushless DC motor in response to a transition in rotor position of the brushless DC motor;
    comparing a shaft speed of the brushless DC motor to a predefined threshold;
    transitioning to a time-based commutation mode in response to the comparison;
    determining a rotor position in response to expiration of a commutation timer having a timeout period corresponding to a desired shaft speed; and
    adjusting current supplied to the DC motor during commutation based upon the rotor position of the brushless DC motor.

16. The method of claim 15, further comprising determining the shaft speed based upon signals from Hall Effect sensors of the brushless DC motor.

17. The method of claim 15, further comprising initiating the commutation timer in response to the transition to the time-based commutation mode.

18. The method of claim 15, further comprising commutating the brushless DC motor by switching the power drive in response to timeout of the commutation timer.

19. The method of claim 15, further comprising transitioning from the time-based commutation mode to the motion-based commutation mode in response to a subsequent comparison of shaft speed to the predefined threshold.

20. The method of claim 15, further comprising transitioning from the time-based commutation mode to the motion-based commutation mode in response to a subsequent comparison of shaft speed to a second predefined threshold.

* * * * *